United States Patent [19]

Grabon

[11] Patent Number: 5,717,313

[45] Date of Patent: *Feb. 10, 1998

[54] BATTERY CHARGING METHOD AND APPARATUS WITH THERMAL MASS EQUALIZATION

[75] Inventor: Robert J. Grabon, Cedar Rapids, Iowa

[73] Assignee: Norand Corporation, Cedar Rapids, Iowa

[*] Notice: The term of this patent shall not extend beyond the expiration date of Pat. No. 5,548,201.

[21] Appl. No.: 700,205

[22] Filed: Aug. 20, 1996

Related U.S. Application Data

[63] Continuation of Ser. No. 304,989, Sep. 13, 1994, Pat. No. 5,548,201.
[51] Int. Cl.$^6$ ..................................................... H02J 7/04
[52] U.S. Cl. ............................................ 320/35; 320/48
[58] Field of Search ................................... 320/35, 48, 43, 320/20, 21; 324/431

[56] References Cited

U.S. PATENT DOCUMENTS

| | | | |
|---|---|---|---|
| 4,455,523 | 6/1984 | Koenck | 320/43 |
| 5,241,259 | 8/1993 | Patino et al. | 320/35 |
| 5,245,269 | 9/1993 | Tooley et al. | 320/35 |
| 5,363,031 | 11/1994 | Miller et al. | 320/21 |
| 5,477,172 | 12/1995 | Shiojima et al. | 320/35 |
| 5,519,303 | 5/1996 | Goedken et al. | 320/35 |
| 5,539,297 | 7/1996 | Fiebig | 320/15 |
| 5,548,201 | 8/1996 | Grabon | 320/35 |
| 5,563,494 | 10/1996 | Cuesta et al. | 320/35 |

*Primary Examiner*—Peter S. Wong
*Assistant Examiner*—Gregory J. Tastley, Jr.
*Attorney, Agent, or Firm*—Lathrop & Gage L.C.

[57] ABSTRACT

A battery charging method in an environment of variable temperatures provides for a temperature correction to determine an onset of an overcharge phase which is detected by a discernible thermal energy output of a charging battery. The method comprises a precursory operation of determining time period required for effecting a temperature change in the battery in response to a temperature change of an ambient space about the battery. The temperature of the battery is then monitored throughout the charging process by measuring the temperature of the battery at timed, predetermined intervals. Over the same timed intervals the temperature of the ambience is measured. A measured difference in the temperature of the ambience with respect to a prior temperature of the ambience is applied to a measured temperature of the battery as modified by a predetermined time delay factor. The temperature is thereby corrected to reflect a change which would have occurred as a result of a temperature change of the ambient space about the battery. The corrected temperature, consequently, represents a temperature of the battery which is the result of the charging process. An apparatus for determining the onset of an overcharge phase of a battery charging cycle includes a control temperature sensor, a battery temperature sensor and a provision for determining when the battery temperature deviates from an anticipated temperature in response to a temperature change of the environment of the battery.

17 Claims, 2 Drawing Sheets

BATTERY CHARGING METHOD AND APPARATUS WITH THERMAL MASS EQUALIZATION

CROSS REFERENCE TO RELATED APPLICATION

This application is a continuation of application for U.S. patent Ser. No. 08/304,989, filed 13 Sep. 1994, now U.S. Pat. No. 5,548,201 issued 20 Aug. 1996.

BACKGROUND OF THE INVENTION

This invention relates generally to methods and apparatus for recharging batteries including but not limited to NiCad batteries or NiMH batteries. More particularly, the invention relates to methods and apparatus for recharging batteries in an environment of variable ambient temperatures.

Rechargeable batteries, such as NiCad (nickel cadmium) batteries or NiMH (nickel metal hydride) batteries are known to undergo a recharge cycle of first and second charging phases. A first phase is referred to as a coulombic charging phase. During the coulombic charging phase most of the charge applied by the charging current is stored in the form of electro-chemical energy. At the end of the coulombic charging phase most of the charge holding capacity of a rechargeable battery has been restored to its charged state. Further charging extends into a second phase which is known as an overcharge phase. During the overcharge phase of a charging cycle the charging current generates oxygen gas at one of the electrodes. During the overcharge phase of the recharge cycle only a small portion of the charging energy becomes stored in the form of electro-chemical energy. Complex or "smart" battery chargers have been devised to add further charge to any battery which is at that time already substantially charged. However, charging a battery in the overcharge phase holds dangers to the battery and should generally be avoided. Charging batteries at excessive charging rates while they are in the overcharge phase may cause gas pressures to build up, in spite of venting provisions built into such batteries, such that carelessly charged batteries may become permanently damaged.

Simple battery chargers, though of good quality, seek to avoid charging batteries into the overcharge phase, by determining the onset of the overcharge phase which is marked by a distinct temperature rise in the battery. The temperature rise may be determined by a typical temperature sensor. Such a sensor, either a thermistor or a semiconductive temperature sensing element may preferably be built directly into a battery pack. Such a battery pack having a temperature monitor may be recognized by three battery terminals instead of two. Two of the terminals are power and ground terminals, and a third terminal provides a temperature-dependent signal, referenced to ground. The temperature-dependent signal may be a voltage signal, for example, to be used as an input signal to a battery charging device. In the interest of saving a battery from becoming damaged by overcharging, batteries are often not charged to their capacity. Even though precautions may be taken to avoid damage to a battery by an overcharge, an apparent problem has now been recognized, according to which the point at which the overcharge phase of a battery begins apparently may not be as readily determined as it is generally believed to be the case.

DISCUSSION OF THE INVENTION

It is therefore an object of the invention to provide an improvement in apparatus for charging a battery according to which the onset of an overcharge phase of the battery is more readily determined than was heretofore possible.

It is yet another object of the invention to monitor the temperature component of a battery attributable directly to a charging process of the battery, to determine a point of increasing temperature due to the charging process, and thereby determine an onset of an overcharge phase with respect to the battery.

It is still another object of the invention to devise a method of charging a battery which includes determining an overcharging condition when the battery is maintained in an environment which is subject to a change in temperature while the battery is being charged.

A realization of the foregoing objects of the invention seeks to overcome a problem that has been observed to be a cause of early termination of a charging cycle for a battery, or a cause for extending the battery charging process into the overcharge phase of the battery instead of shutting off the battery charger. On close examination, it has been found, a battery charging operation tended to be terminated prematurely when a portable, battery operated apparatus was charged in an environment of decreasing ambient temperatures. It has also been discovered that the charging operation of the battery of a portable apparatus tended to extend into the overcharge phase in an environment of increasing ambient temperatures.

The invention is particularly applicable to charging what is known in the art as "embedded batteries". Embedded batteries are batteries which are contained within certain portable pieces of apparatus, as they find widespread use in various phases of modern life and industry, for example, as hand-held data collection terminals, portable radios, portable electronic test equipment, or any other types of electronic, battery operated apparatus. The invention takes into consideration what may be referred to as a "thermal mass" of a combination of a respective piece of apparatus and its embedded battery. The term "thermal mass" as used herein pertains to a delay in actual temperature change with respect to time that is incurred when the ambience of the battery or the apparatus wherein the battery is located is subjected to a temperature change. Thus, the term thermal mass is used to refer to the physical resistance or impedance to change in response to a temperature change. When a change in temperature occurs externally of the battery or of the device within which the battery is contained, there is a lagging response due to resistance to heat flow into or out of the battery and through the surrounding device or apparatus. The lag occurs, regardless of whether the change in temperature is gradual or whether it is a stepped change, such as would occur when a battery powered apparatus is used outdoors on a cold Winter day and is then taken indoors to be recharged. It would be apparent, that a delay would be more pronounced when the battery is embedded within a device or piece of apparatus, and insulative properties of the apparatus, as well as the thermal impedance of the battery itself, contribute to a delay of the battery in adjusting to a change in temperature. In a broader sense and in a specific application of the invention, a battery need not be embedded within an apparatus or device to be subjected to the advantages of the invention. A battery in and of itself may undergo slow heating when suddenly taken from a relatively cold environment to a comparatively warm room for charging. When a temperature change is applied externally of the battery or externally of the system within which the battery is embedded, the temperature of the battery changes at a complex rate which takes into consideration the severity of a temperature change, the resistance to the heat flow that the system inherently offers, and the thermal mass. Thus a heat transfer profile is ideally obtained by measuring temperature differences and approximate times required to effect a certain temperature at the battery in response to such temperature differences. It is this profile of a delayed temperature change in response to a change in the ambient temperature that is used to compensate temperature measurements on the battery to determine more precisely than heretofore possible the onset of the overcharge phase. When this onset can be determined with precision, a battery may then actually be charged at a low charging rate into the overcharge phase for a fully recharged battery at the conclusion of the charging process. The invention does not pertain as such directly to the type of battery charging process or to the charging current profile to be applied to the battery. Instead, the invention pertains to determining and to compensating for a temperature profile of a battery when the battery is subjected to temperature changes while being recharged.

There are differences in the manner in which the determination of the temperature profile of the battery can be made and in which the temperature profile can be applied. A first type of determination would entail subjecting the battery to a stepped temperature change and then determining a resulting profile. The battery subject to this type of temperature profile determination would be of the type which has a temperature sensor embedded within the battery or battery pack. A second temperature sensor establishes the temperature of the environment. The process amounts to a determination of the thermal mass or impedance, consequently, of the profile in time of temperature change of the battery in response to the stepped temperature change in its environment. This profile establishes how the temperature changes each instance from the time the battery is subjected to a difference in temperature with respect to that of the locale of the charger, until the temperature of the battery has become substantially equal to that of the locale of the charger. The profile in time of temperature change, or temperature profile, should be determined in the absence of any heating of the battery due to current flow through the battery, either charging or discharging. Further, the determination of the thermal mass or impedance to a temperature change should include the precise thermal conditions of the immediate environment of the battery which makes up the thermal mass or temperature change-delaying factor. The same battery might have, and should be expected to have, a different total thermal mass when embedded in a first type of apparatus, as contrasted with being embedded in a second type of apparatus which may be either bigger or smaller or more or less compact than the first. Another criterion in a determination of a thermal mass of an embedded battery is the electrical state of the apparatus within which the battery is embedded. If, from an electrical standpoint, the apparatus remains electrically inactive during the charging cycle of the battery, the thermal mass or temperature profile of the battery must be determined with the apparatus being shut down or turned off. If, however, the apparatus is expected to be operating during the battery charging operation, the temperature profile of the battery should be determined with the respective apparatus being turned on and operating, but again, without the battery being charged. Further, when a charging operation may proceed with the apparatus or device within which the battery is embedded being either operating or not operating during a charging cycle, the determination of the temperature profile should be made separately for both conditions.

In a first operating mode, the determined temperature profile may be recorded or stored electronically in a look-up table on electronic storage media or in an electronic storage memory of a charge control circuit. In a preferred alternate operating mode, temperature corrections may be calculated from actually measured temperature changes which may be obtained at predetermined measuring intervals. When corrections are calculated from actually measured temperature changes that occur in a specific type of apparatus, the correction factors are unique to a specific type of apparatus and have to be predetermined for the specific type of apparatus.

The same criteria apply to using a look-up table. For different types of apparatus, or for different charging conditions, such as whether the apparatus is operating or not, different recorded temperature profiles should be available. On the other hand, a first battery in a first type of apparatus would be subject to the same temperature profile as a second battery of the same kind in the same first type of apparatus. Thus, temperature profiles are found to be the same for like models of portable devices.

The determination of the onset of an overcharge phase in accordance herewith comprises reading the temperature of the battery from the temperature sensor of the battery or battery pack, determining the temperature of the environment and computing a temperature difference between the charging environment and the battery. The computed temperature difference is then compared to a corresponding temperature difference on the look-up table to obtain a starting point for timed corrections to be applied to the battery during the charging cycle. The look-up table will either provide a positive or a negative correction factor which corresponds to a timed respective decrease or increase in temperature of the battery to adjust its temperature to that of the environment in absence of heating due to charging. Thus, when a temperature difference is obtained in a comparison circuit, for example, such temperature difference is not because the battery had been subjected to a temperature change, but because the battery has undergone a temperature change as a result of electro-chemical charging effects. An observed temperature change of the corrected battery temperature consequently will accurately determine an onset of the overcharge phase.

The described temperature correction using a predetermined temperature profile may ideally be used in conjunction with an automated battery charger. The battery charger may include a temperature sensor to sense the temperature of the environment within which the battery is to be charged. The battery charger may further include a microprocessor circuit with a corresponding memory storing operating instructions to apply a predetermined charging cycle to a battery being recharged. The microprocessor circuit would, in accordance herewith, also include data storage for the referred-to look-up tables and access instruction to select and apply the temperature corrections from a selected look-up table to temperature readings obtained from a temperature sensor embedded in a battery or battery pack to be charged. The type of device within which the battery is to be charged may be automatically recognized by the battery charger, or it may need to be selected by an operator connecting the device to the battery charger.

In a preferred embodiment of the present invention, instead of referring to prerecorded values of a look-up table to adjust measured temperatures for externally occurring temperature changes, predetermined compensation factors are found to advantageously convert actually measured temperature differences in a periodic temperature compensation to eliminate temperature effects resulting from variable ambient temperature conditions. Accordingly, an anticipated or characteristic temperature change at a battery may be computed by measuring a temperature difference between the ambient space and the battery during an initializing measurement event, and then measuring a time lag or time delay for the battery to respond with a resulting temperature change of, for example, a predetermined percentage change of the measured temperature difference. Well known curve fitting routines may be employed to match a temperature response of a control temperature probe to a corresponding temperature response of a battery temperature probe. It appears that the time lag or time delay in receiving such a desired result remains substantially constant for any given system of a battery or of a combination of an embedded battery and the device within which the battery is embedded. A resulting charging operation may therefore differ from the above-described microprocessor controlled battery charging operation.

Accordingly, a portable device or apparatus may include a first temperature sensor which is located away from the battery and away from any resulting electro-chemical heating effects which occur as when the battery is being charged. A second temperature sensor would be embedded, as it is known in the art, in a battery or battery pack, thus located to register the temperature of the battery as it exists at any given time. The second temperature sensor therefore indicates between any two successive readings a temperature change in the battery, regardless of whether the change is due to an electro-chemical reaction within cells of the battery pack, or whether it is the result of a changing temperature environment. The temperature of the battery may have been determined as a temperature difference between the temperature of the battery and the environment, and a time delay to effect a correction of a certain part of the difference at the battery. A temperature change at the battery may further be determined by measuring a temperature change of the first temperature sensor and a timed relationship between the change in the temperature of the first sensor and the second sensor in the battery to undergo a similar proportioned temperature change. The timed relationship which is determined in lieu of a temperature-time profile indicates the time interval for the battery pack to respond to a temperature change sensed by the first temperature sensor of portable device. In other words a characteristic time delay is established between the embedded battery and the environment of a portable device of the embedded battery, as determined by the time required for the second, the battery temperature sensor to undergo a predetermined temperature change as the first temperature sensor. The predetermined temperature change may be taken as substantially the same change as that measured at the first temperature sensor. However, it is deemed to be more desirable to determine a time interval during which, for example, one half of the measured temperature difference between the first and second temperature sensors will have been applied as a temperature change measured by the second temperature sensor. Depending on the location of the first temperature sensor, and its thermal mass or ability to react to a change in temperature, the time delay may be relatively short or long. However, once determined, the time delay will remain the same for the same type and model of portable devices, provided the positions of the first and second temperature sensors remain unchanged relative to the portable device.

In a process of monitoring temperatures sensed by the second temperature sensor, the sensor of the battery pack, according to this latter embodiment, first the characteristic time delay of reaction between the first and second sensors is determined, as described. The characteristic time delay is recorded or stored. When the battery pack of the portable device is being charged, temperatures measured or read at the battery pack are corrected by sensing throughout the respective charging cycle temperature changes due to a changing temperature environment at the first temperature sensor remote from the influence of the battery. The sensed temperature changes are then applied, with the pre-established and recorded delay in time to correct the temperature measured at the second temperature sensor indicating the actual temperature of the battery pack. Thus, a marked temperature increase of the temperatures corrected by the delayed temperature changes would signify an onset of the overcharge phase of the battery.

In a particular embodiment of the invention in a portable data collection terminal as a portable device requiring the charging of a battery, the portable data collection terminal includes in a frontal shell of its housing an LCD screen and a keyboard. The operation of an LCD screen is known to be temperature sensitive. Thus, a temperature sensor is used to provide temperature data at the LCD screen to automatically adjust its contrast. The temperature sensor is strategically placed against the backside surface of the LCD screen. According to a specific embodiment of the invention, the already existing temperature sensor of the LCD screen may be used advantageously as a first or control temperature sensor away from influence of heat which may be generated by the battery pack. In establishing a characteristic delay for the portable data collection terminal, the characteristic temperature delay between the temperature sensor of the LCD screen and the temperature sensor of the battery pack which powers the portable data collection terminal is determined and recorded. The delay is obtained by subjecting the portable data collection terminal to a temperature change and measuring the length of time it takes for the battery to undergo substantially the same temperature change. It is to be noted that a body having a thermal mass tends to asymptotically approach a changed temperature level. Also, both the temperature sensor at the LCD screen and the temperature sensor at the battery have a characteristic delay in reacting to a change in the ambient temperature, allowing, all considered a determination of a characteristic time delay for the temperature change at the battery with respect to the temperature change at the LCD screen. The temperatures measured by the temperature sensor of the battery pack during a battery charging operation are then corrected with temperature changes measured at the LCD screen during the period of the battery charging operation. The correction is applied to the temperatures measured by the temperature sensor of the battery pack, using the pre-established time delay between the temperature changes measured at the LCD screen and the battery pack. This means that if the predetermined delay amounts to, for example, five (5) minutes, during the first five minutes of the charging process, no temperature correction will be applied to the temperature measured at the battery pack. Given a normal battery recharging cycle, no overcharging would occur during the first five minutes of a battery recharging operation.

In further consideration of using the time delay between first and second temperature sensors representing a control temperature sensor and a battery temperature sensor, respectively, it is contemplated within the scope of this invention, to match or equalize the thermal mass or impedance of such first and second temperature sensors. When a thermal impedances of both temperature sensors are the same, considering in the thermal mass their location within the respective portable device, there will be no time delay in a measured temperature change due to a changing temperature environment as measured by either the first or the second temperature sensors. Therefore, a temperature change measured by the first or control temperature sensor may be directly applied without delay to correct the temperature measured by the second or battery temperature sensor. A remaining temperature change after such correction measured by the battery temperature sensor must then be taken as an indication of onset of the overcharge phase of the battery.

This latter embodiment can be applied advantageously to provide a "smart" battery temperature sensor. Accordingly, a battery or battery pack would be equipped with two temperature sensors. A first one of the two temperature sensors is embedded in a thermal mass which forms part of the battery pack, but which is effectively thermally insulated from battery cells of the battery pack. The first or control temperature sensor would sense a temperature or temperature change of the ambient space of the battery but would not sense the temperature of the cells of the battery pack or a change thereof. A second temperature sensor or battery temperature sensor is embedded into the battery or battery pack itself and senses immediately the actual temperature of the cells of the battery pack. In accordance with the invention, the delay with which the individual battery cells of the battery pack respond to temperature changes in the ambient space about the battery cells is matched by the control temperature sensor. The match must be carefully designed into the structure and location of the control temperature sensor in the pack.

For simplicity, the structure to provide the correct thermal impedance to the control temperature sensor to match that of the battery temperature sensor would be determined by experimentation. The time delay for a response to a stepped temperature increase is first determined for the battery temperature sensor. The location of the control temperature sensor may be chosen to be at one end of the battery pack. Sufficient thermal insulation is placed between the cells of the battery pack and the control temperature sensor to effectively insulate the control temperature sensor from being affected by short term temperature changes within the battery cells, such as may be caused by an onset of an overcharge phase during a battery charging cycle. The control temperature sensor is then shielded from actual thermal changes in the ambient space to generate a delayed response to such temperature changes which matches a delayed response by the battery temperature sensor. The match is obtained by comparing the output signal of the control temperature sensor to that of the battery temperature sensor and removing or adding shielding between the control temperature sensor and the ambient space until the response times to discrete temperature changes of the two temperature sensors are matched to each other.

It may be further possible to approximate the thermal mass of the battery sensed by the battery temperature sensor in a characteristic time delay or time lag by coupling the output of the control temperature sensor to an resistance-capacitor network (R-C network) and match the R-C value to approximate the thermal mass of the battery. In this manner, the packaging of the control temperature sensor may be simplified. Thermal isolation between the control temperature sensor and the battery cells must still be provided to protect the control temperature sensor from a feedback reading from a heating or cooling of the battery.

The control temperature sensor may be part of a signal circuit, such as an integrated circuit, which provides an active signal when a temperature difference between the battery temperature sensor and the control temperature sensor indicates an onset of the overcharge phase of a battery charging cycle.

SUMMARY OF THE INVENTION

According to the invention, a process for charging a battery in an environment of variable temperatures and for determining an onset of an overcharge phase marked by a discernible thermal energy output of a charging battery comprises a precursory operation of determining time period required for effecting a temperature change in the battery in response to a temperature change of an ambient space about the battery. The determined time period or time lag to effect the temperature change in the battery is recorded. The temperature of the battery is then monitored throughout the charging process by measuring the temperature of the battery at timed, predetermined intervals. Over the same timed intervals the temperature of the ambient space is measured. A measured difference in the temperature of the ambient space with respect to a prior temperature of the ambient space is applied to a measured temperature of the battery after a time delay according to the already determined time period to correct a corresponding, measured temperature of the battery being charged. The temperature is thereby corrected to reflect a change which would have occurred as a result of a temperature change of the ambient space about the battery. The corrected temperature, consequently, represents a temperature of the battery which is the result of the charging process.

The process is applied according to the invention to a battery charging process for a battery embedded within a portable device which device represents in combination with the battery a predetermined thermal mass. The thermal mass results in a characteristic time delay for the battery to change its temperature by a predetermined temperature difference in response to a stepped temperature change of the ambient space about the portable device. A corresponding process includes measuring a time delay between a measured temperature change at a first temperature sensor of the portable device and a resulting temperature change at a second temperature sensor embedded within a battery of the portable device. Then, during the charging process of the battery, the temperature at the first temperature sensor is measured and recorded at predetermined intervals. Also, the temperature at the second temperature sensor is measured at the same predetermined intervals. After the predetermined characteristic delay of time, consecutive temperature readings at the first temperature sensor are recalled from storage, and differences between such consecutive readings are subtracted from a current temperature reading at the second temperature sensor to correct the current temperature reading for a change in temperature due to a temperature change of the ambient space about the portable device.

According to one particular embodiment of the invention, the measured characteristic time delay between a sensed temperature change by the first and second temperature sensors may be negligible or substantially zero.

According to the invention, the measured characteristic time delay between the sensed temperature change by the first and second temperature sensors may be characteristically different in a different embodiment and amount to five minutes.

According to another aspect of the invention, a control temperature sensor and a battery temperature sensor are thermally isolated from each other and are disposed to sense, respectively, a thermal influence of a space surrounding a battery on the temperature of the battery, and a temperature of the battery. The thermal influence of the space surrounding the battery on the temperature of the battery is defined by a temperature at the control temperature sensor and the time a temper time delay between the time a temperature change of the space surrounding the battery is sensed by the control temperature sensor and the time the battery temperature sensor has sensed that the temperature of the battery has changed in response to the temperature change of the space surrounding the battery. In one embodiment, the characteristic time delay may be negligible.

Other features and advantages of the invention will become apparent from reading the detailed description below.

BRIEF DESCRIPTION OF THE DRAWINGS

The detailed description of the invention may be read in reference to the appended drawing wherein:

FIG. 1 shows a schematic representation of a portable or battery powered apparatus, such as a hand-held data collection terminal, a portable radio, a cellular telephone, portable test equipment or the like;

DETAILED DESCRIPTION OF THE INVENTION

Figure 1:
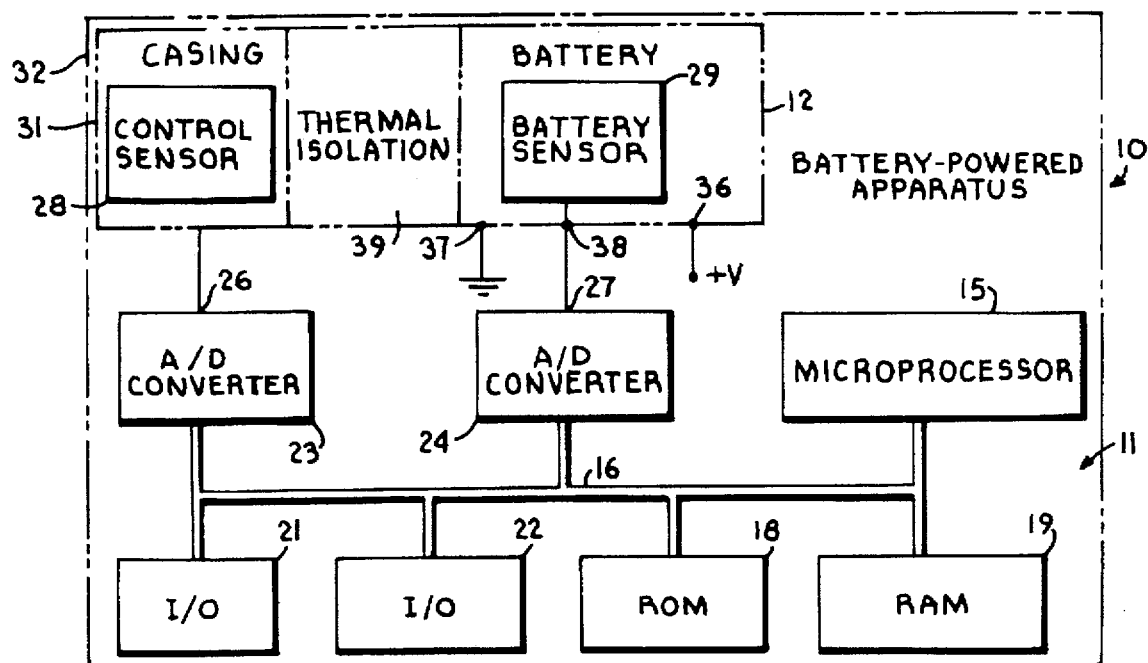

Referring now to FIG. 1, there is shown a schematic representation of a portable or battery powered apparatus or device designated generally by the numeral 10. The portable apparatus 10 includes a control circuit designated generally by the numeral 11, which, for illustrative purposes, is a microprocessor-operated or microprocessor control circuit 11. Microprocessor circuits are known to be convenient and advantageous for controlling operating functions of various known portable electronic apparatus, such as, for example, hand-held data collection terminals, portable radios, cellular telephones, programmable travel alarms, or portable electronic test equipment, to name a few. These portable types of apparatus are often preferred to be powered by rechargeable batteries. The portable apparatus 10 contains embedded therein a rechargeable battery pack 12 ("BATTERY"), which is generally made up of a number of individual cells of nickel metal hydride ("NiMH") or nickel cadmium ("NiCad") type batteries which are coupled to provide the desired battery voltage. As an example, six 1.2 volt cells may be coupled in series to yield a nominal battery voltage of 7.2 volts.

The control circuit 11 includes a microprocessor device 15 ("MICROPROCESSOR") which is typically coupled through an address and data bus 16 to a read-only memory 18 ("ROM") and to a random access memory 19 ("RAM"). The ROM 18 is known to contain fixed microprocessor control code or programs like BIOS, and may contain other control programs which are characteristic for the operation of the particular apparatus 10. The ROM 18 may be masked or permanent memory or, as in some state-of-the-art devices, the ROM 18 may be electronically programmable permanent or static memory. The RAM 19 is preferably chosen to be state-of-the-art dynamic memory. The control circuit 11 further includes one or more addressable input-output devices, such as two depicted I/O devices 21 and 22 ("I/O"), and may include other data devices (not shown) which would also be addressable by the microprocessor 15 through the bus 16. The microprocessor also receives data inputs through the bus 16 from first and second analog-to-digital signal converters ("A/D CONVERTER") 23 and 24, respectively. First and second analog signal terminals 26 and 27 are coupled to apply analog type voltage signals from a first or control temperature sensor 28 ("CONTROL SENSOR") and from a second or battery temperature sensor 29 ("BATTERY SENSOR") to the analog-to-digital (A/D) converters 23 and 24, respectively.

The control temperature sensor referred to herein as control sensor 28 is preferably mounted within a structural protective portion 31 ("CASING") of the portable apparatus 10, yet in a position which is substantially under the influence of ambient temperatures. Desirably, the control sensor 28 is disposed within the apparatus 10, inside of the apparatus element 31 which is not likely to be in contact with the hand of an operator carrying the apparatus 10, to avoid body heat affecting an ambient temperature reading prevailing at the portable apparatus 10. In a particular embodiment of the apparatus 10 being a hand-held data collection terminal, a major surface area of a housing or, generally, outer confines 32 of the apparatus 10 would be occupied by an LCD screen. In the case of such a hand-held data collection terminal as the apparatus 10, the control temperature sensor 28 is chosen, for example, to be a thermode 28 disposed on an inner surface of an LCD screen (see the schematically depicted element 31 as forming part of the housing).

The battery temperature sensor 29 or battery sensor 29 is preferably embedded between individual cells of the battery pack 12, and hence its temperature readings indicate substantially the actual temperature of the battery pack 12. The battery pack 12 is what is referred to as a "temperature sensing power pack". As such the battery pack 12 has a positive terminal 36 ("+V"), a ground terminal 37 and a temperature output signal terminal or battery sensor terminal 38, the latter being electrically the same as the analog signal terminal 27 of the A/D converter 24.

To most advantageously implement and use the features of the invention, a greater degree of exposure of the control sensor 28 to ambient temperatures than that of the battery sensor 29 is desirable, if not necessary. In other words, a greater thermal impedance desirably exists between the ambient of the apparatus 10 and the battery pack 12, than between the ambient of the apparatus 10 and the control sensor 28. The battery pack 12 is often located within a battery compartment of the apparatus 10, and heat flow has to overcome the thermal impedance of the apparatus 10 in addition to the thermal impedance and thermal mass of the battery pack 12. But even if the battery pack 12 were not imbedded within the apparatus 10, the battery pack 12 itself generally represents a substantial thermal impedance and mass to ambient temperature changes.

Another desirable if not necessary condition for realizing the advantages of the present invention is a high degree of thermal isolation between the control sensor 28 and the battery 12. It would be undesirable to allow the battery temperature to affect a temperature reading by the control sensor 28. Thus, a thermal impedance 39 ("THERMAL ISOLATION") is shown in FIG. 1 to depict a lack of influence of the actual battery temperature on an indicated temperature reading by the control sensor 28. Thus, though the ambient temperature would generally influence both the control sensor 28 and the battery sensor 29 (the latter substantially following the actual battery temperature), the battery temperature itself will essentially have no influence on the temperature of the control sensor 28. The described thermal relationships and the control sensor 28 and the battery sensor 29 are now advantageously used to determine an optimum length of a battery recharging cycle under randomly variable ambient temperature conditions.

Figure 2:
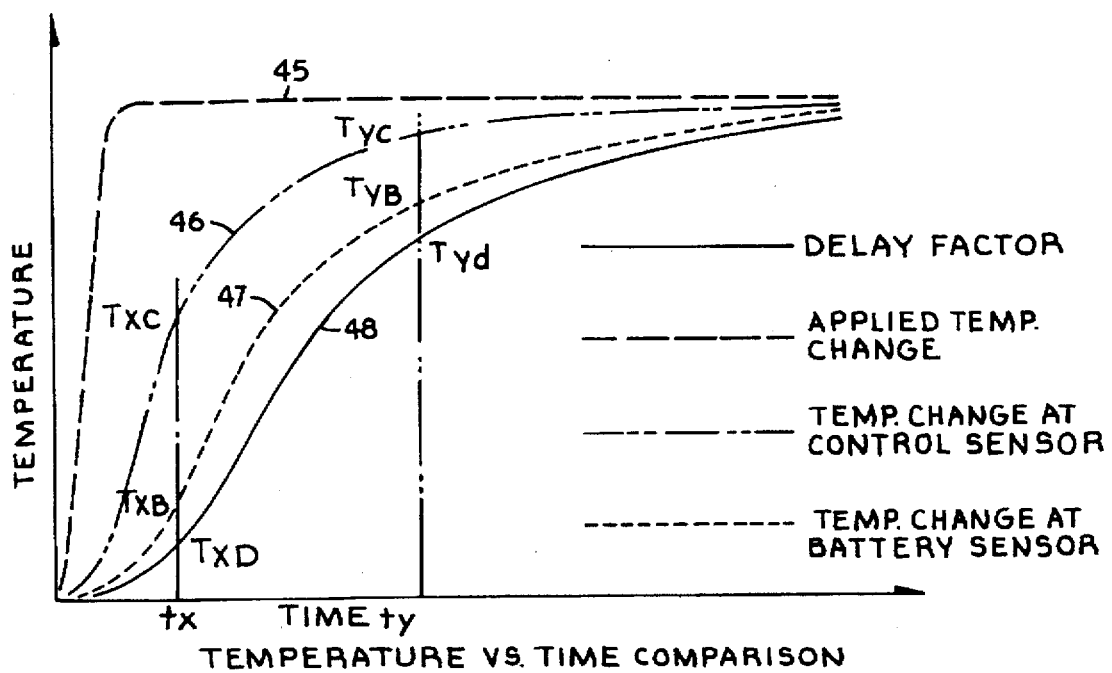
FIG. 2 shows a graphic illustration of temperature changes over time as may be experienced by the portable apparatus shown in FIG. 1 in response to an applied ambient temperature change.
Figure 3:
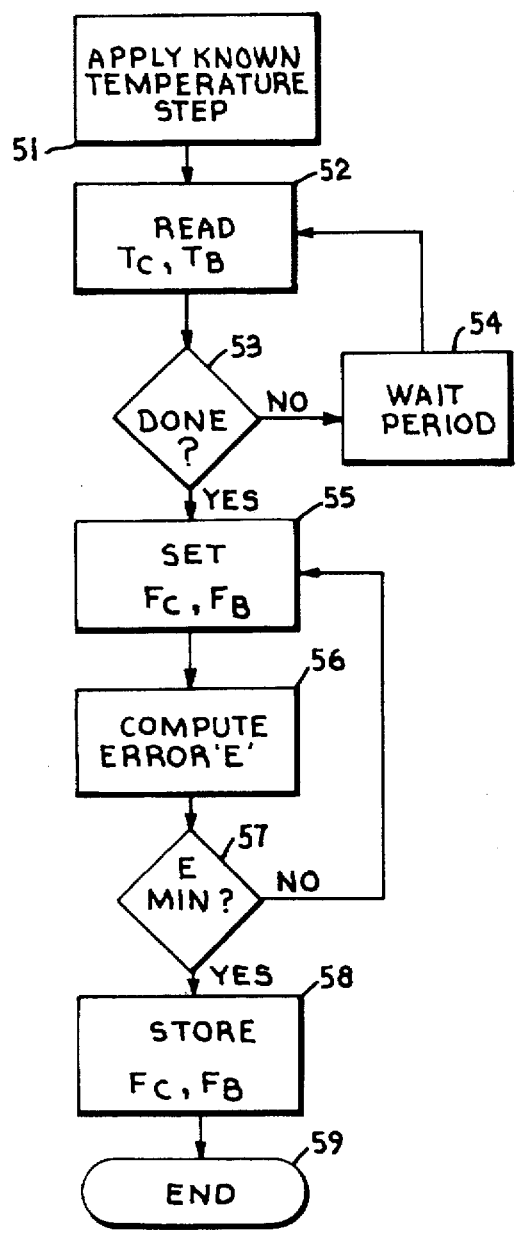
FIG. 3 is a flow chart of steps for determining quantitative time factors or constants of delays or lagging responses which may be expected, respectively, at a control temperature sensor and at a battery temperature sensor in response to a temperature change of the ambience of the portable apparatus, as shown in FIG. 1.

In reference to FIGS. 1, 2 and 3, the extent to which ambient temperature changes affect the control sensor 28 and the battery pack 12 as sensed by the battery sensor 29 needs to be determined. When characteristic responses of both sensors 28 and 29 to ambient temperature changes are known, then a deviation by the battery sensor 29 from the characteristic response as measured by the control sensor 28 is indicative of an independent temperature change in the battery pack 12. Such independent temperature change, however, signals the onset of an overcharge phase of the charging cycle and as such a prudent stopping point for the battery charging operation.

FIG. 2 shows a graphic illustration of temperature changes over time as may be experienced by the portable apparatus 10 (shown in FIG. 1) in response to an applied ambient temperature change of a known magnitude. Graph 45 represents an applied stepped increase in the ambient temperature from a first to a second known temperature. The actual magnitude of the step is less important than the fact that the magnitude of the step, hence the initial and the final temperatures are known. A convenient step of, for example, from 0 to 40 degrees C. approximates a temperature range that may be encountered under actual operating conditions of the apparatus 10. It is to be understood, however, that under actual operating conditions, temperature changes are more likely to occur gradually rather than as a defined step. However, for determining magnitudes of response delays at each of the sensors 28 and 29 in response to any kind of change in the ambient temperature, applying a temperature step of known magnitude is most desirable.

In FIG. 2, graphs 46 and 47 represent exemplary response curves of temperature readings versus time by the control sensor 28 and the battery sensor 29 (see FIG. 1) as a result of the stepped temperature change represented by graph 45. At an elapsed time $t_x$ after application of the known temperature step, the temperature measured or read by the control sensor 28 has changed to $T_{xc}$ and the temperature measured by the battery sensor 29 indicates $T_{xB}$, showing that the battery pack 12 is slower to respond to an ambient temperature change than the control sensor 28. Given enough time, both sensors 28 and 29 would ultimately read substantially the same temperatures in response to the applied temperature change as represented by graph 45. It is desired to normalize the temperature response curve 46 to become comparable with the temperature response curve 47. Experimentation has shown that a normalization of the response curve 46 for comparison purposes with the response curve 47 is best accomplished by determining a "delay factor" for the temperature readings by the control sensor 28 and by the battery sensor 29 at any given time, such that an RMS value as a curve fitting error "E" over an entire measuring interval is minimized. Thus, rather than scaling the temperature values represented by the temperature graph or curve 46 to the read temperature values represented by the temperature graph or curve 47, scaling both of the read values by respective delay factors $F_c$ and $F_B$ to a common temperature curve represented by temperature graph 48 in FIG. 2 has been found to be better suited. Using a single and separate delay factor for each of the measured temperatures in a comparison, has been found to permit the single delay factor to be used over the entire operating range of the apparatus 10 of FIG. 1. For example, for the above example in which the portable apparatus 10 is a hand-held data collection terminal, a delay factor determined for the control sensor readings ("$F_c$") was found to be $1/890$, while the corresponding delay factor for the battery sensor readings ("$F_B$") was determined to be $1/260$.

When the temperatures of the temperature response curves 46 and 47 were corrected by the predetermined respective delay factors, the corresponding corrected or delayed temperatures are substantially represented by the common curve of graph 48. At the respective timed events $t_x$ and $t_y$, the measured temperatures $T_{xc}$, $T_{xB}$ and $T_{yc}$, $T_{yB}$ become, consequently, $T_{xD}$ and $T_{yD}$, respectively.

Again in reference to FIGS. 1, 2 and 3, FIG. 3 shows a flow chart of steps which outline the procedure for determining values for the time factors or constants of delayed temperature changes as described above. In step 51 ("APPLY KNOWN TEMPERATURE STEP"), the apparatus 10 of FIG. 1 is subjected to a temperature change of known magnitude. A 40 degree C. change, as described above, is found to be satisfactory for the purpose. The temperatures at the control sensor 28 and the battery sensor 29 ("READ $T_c$, $T_B$") are initially recorded as indicated at step 52. A cycling interval for completing a measurement cycle for the curves shown in FIG. 2 may be determined experimentally for the type of apparatus 10. For a hand-held data collection terminal, a 20 minute step was found to be adequate. During this cycling interval, the delayed temperatures should approach the changed ambient temperature to within a predetermined tolerance, for example, within ten or five percent of the change. Until the desired cutoff point is reached, periodic temperature measurements are recorded. The determination of when the cutoff point is reached is indicated in the flow chart of FIG. 3 by a test 53 ("DONE?"). If answered in the negative, a "WAIT PERIOD" 54 of a predetermined time interval determines the frequency at which temperature measurements are repeated. A computer setup (other than the microprocessor circuit 11 of the apparatus 10) is preferably used for the preliminary procedure of determining the delay factors specific for a particular type of the apparatus 10. If the data are taken automatically by a computerized test setup (not shown) recording temperature data at a relatively high rate would not present a problem and temperature changes at, for example, one-second intervals could be recorded. Once the temperature data have been ascertained for a predetermined measuring cycle, the respective delay factors can be determined by a convenient curve fitting procedures. Such a routine would, by reiteration, determine those values of delay factors $F_c$ and $F_B$, for correcting measured temperatures at the control sensor 28 and the battery sensor 29, respectively, which minimize an error "E" of RMS difference values between respective temperature adjustment equations. The sequence of steps for determining the respective delay factors are numbered 55 through 59 in FIG. 3.

The common delayed temperature response curve 48 in FIG. 2 for both the control sensor 28 and the battery sensor 29 is obtained by multiplying a temperature change at the respective sensors measured over a convenient measuring interval by the delay factor. By design, as previously explained, the control sensor 28 is disposed within the portable apparatus 10 (see FIG. 1) to respond faster to an ambient temperature change than the battery sensor 29. Thus, a temperature change, which in FIG. 2 is shown as a temperature increase in time, is scaled by a first scaling factor $F_C$ for the temperature change measured by the control sensor 28, and by a second scaling factor $F_B$ for the temperature change measured by the battery sensor 29, such that temperature changes for either temperature sensors 28 or 29 are represented by the common curve 48. The temperature correction equation used for the first or control sensor 28 is $$[T_{Cn}-T_{CC(n-1)}]*F_C+T_{CC(n-1)}=T_{CCn}, \tag{1}$$

where $T_{Cn}$ is the currently read temperature read at the control sensor 28 and includes the initial reading $T_C$ when n is equal to zero; $T_{CC(n-1)}$ is the corrected control temperature from the previous calculation and corresponds only during the first calculation after initiation of the battery charging operation to the initial control sensor reading $T_C$; and $T_{CCn}$ is the corrected current temperature as will be used in a comparison and applied in a subsequent calculation.

The temperature correction equation which corrects for the delayed ambient temperature changes measured at the battery is $$[TBCn-T_{BC(n-1)}]*F_B+T_{BC(n-1)}=T_{BCn}, \tag{2}$$

where $T_{BN}$ is the currently read temperature at the battery sensor 29 and includes the initial reading $T_B$ when n is equal to zero; $T_{BC(n-1)}$ is the corrected battery temperature from the previous calculation and corresponds only during the first calculation after initiation of the battery charging operation to the initial battery sensor reading $T_B$; and $T_{BCn}$ is the corrected current battery temperature as will be used in a comparison and applied in a subsequent calculation.

Temperature readings from the delay-corrected temperature curve 48 in FIG. 2 of the control sensor 28 when compared to correspondingly corrected temperatures read by the battery sensor 29 become indicative of temperature changes due to internal heating of the battery pack 12. A sudden upward temperature deviation at the battery pack 12 from the corrected temperature curve 48 during a battery charging operation is therefore indicative of the onset of the overcharge phase. Such a temperature deviation is determined by taking the difference between the corrected temperatures as shown in the following equation:

$$DT=T_{BCn}-T_{CCn}, \tag{3}$$

where DT is the delta deviation between the most recently read temperatures read at the sensors 28 and 29 and corrected in accordance with the above equations (1) and (2).

In step 55 ("SET $F_C$, $F_B$"), initial values for $F_C$ and $F_B$ are assumed. For step 56 ("COMPUTE ERROR 'E'"), DT in equation (3) is set to zero and an RMS deviation value is computed using recorded temperature values in response to a stepped known ambient temperature change as described above. One of the assumed delay factors (for example $F_c$) is then stepped in known increments to move the error toward a minimum. When a minimum is found, the other delay factor (such as $F_B$) would then be indexed by known increments to converge toward a minimum error again. Then the first delay factor would again be converged to again minimize the RMS error between the two relationships until optimum characteristic scaling or correction factors $F_C$ and $F_B$ have been determined for the particular type of portable apparatus 10. Decision step 57 ("E MIN?") sets forth the described branching step during which a determination is made as to whether the error function has converged satisfactorily. When the convergence is answered in the affirmative, the optimum values of $F_C$ and $F_B$ are recorded as set forth in step 58. Recording the optimum values of $F_C$ and $F_B$ concludes (as indicated in step 59) the procedure of determining characteristic temperature delays of the battery pack 12 of the portable apparatus 10 in response to ambient temperature changes. The characteristic delays are then used in the already described calculation of corrected temperature changes and the determination of the onset of an overcharge condition using the corrected or delayed temperatures.

Figure 4:
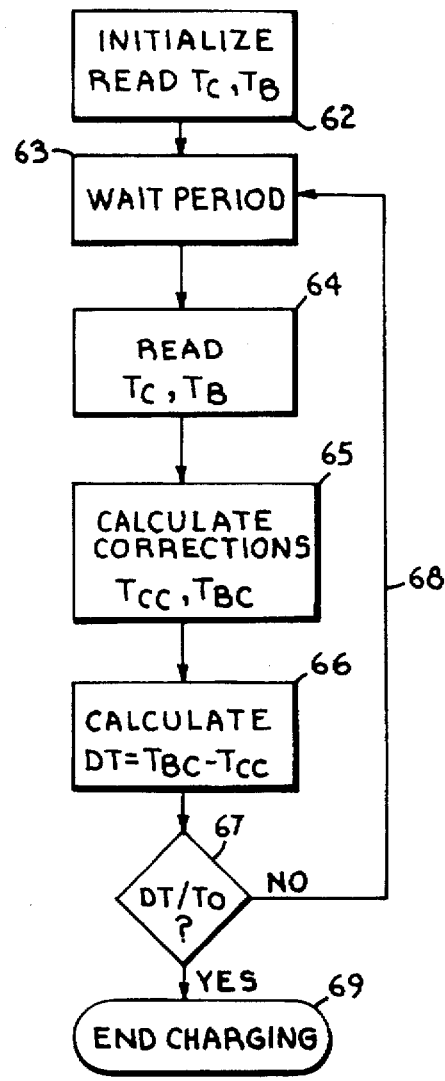
FIG. 4 is a flow chart of steps for determining the onset of an overcharge phase of a battery charging operation as the charging point for discontinuing the battery charging operation.

In reference to FIGS. 1, 2 and 4, a battery charging operation of the portable apparatus 10 under variable ambient temperatures is improved by the determination of a characteristic delay in response to an ambient temperature change and is enhanced by establishing an onset of an exothermic overcharge phase of the battery pack 12 with respect to a sensed temperature change at the control or reference temperature sensor 28. FIG. 4 particularly sets forth a flow sequence of operational steps 62 through 69 according to which the influence of or effects of variable ambient temperatures are neutralized for purposes of determining the onset of the exothermic overcharge phase of the battery pack 12.

Step 62 ("INITIALIZE READ $T_C$, $T_B$") marks the beginning of a charging operation with the representative battery pack 12. For purposes of discussion, it may be assumed that the battery pack 12 is to be charged for a charging period of approximately three hours. After that time period the battery pack 12 under sustained charging conditions may be expected to enter an exothermic overcharge phase. The battery charging operation is to be terminated on detection of an onset of the overcharge phase.

At the beginning of the charging cycle, various charging parameters may be set, as may be desired in accordance with known automated battery charging operations. In addition, in accordance herewith, initial temperatures are read and recorded by the first or control sensor 28 and by the second or battery sensor 29. Step 63 ("WAIT PERIOD") represents a predetermined wait period or sampling interval for repetitively recording temperatures which are sensed at successive sampling events (n=1, 2, 3 . . . etc.) at the control sensor 28 and at the battery sensor 29. Since the recharging operation is a comparatively long, drawn out process, the sampling interval or sampling period need not be extremely fast, as may be possible with microprocessor-controlled sampling circuits (as is the circuit 11). A reasonable, predetermined sampling interval or period, for example, may be an interval of ten seconds, which then becomes the "wait period" 63.

After each successive wait period 63, the temperatures are read and recorded as indicated by step 64 ("READ $T_C$, $T_B$"). Step 65 ("CALCULATE CORRECTIONS $T_{CC}$, $T_{BC}$") uses the above-described equations (1) and (2), and the predetermined scaling or temperature delay factors $F_C$ and $F_B$ to compute a delay corrected temperature and an anticipated delay corrected temperature at the battery pack 12. The resulting corrected temperatures $T_{BC}$ and $T_{BC}$ are then compared in step 66 ("CALCULATE $DT=T_{BC}-T_{CC}$") to determine the magnitude of the difference between the two. It should be noted that FIG. 2, for example, shows a temperature step in the positive direction. However, it has been determined that delays apply and are determinable for temperature changes in either direction. Thus, the difference between the anticipated and actual corrected temperature at the battery pack 12 ($T_{CC}$ and $T_{BC}$, respectively—, applies, whether the ambient change is an increase or decrease in temperature.

Step 67 ("$DT>T_O$?") is a branching step, based on the outcome of a query whether the difference exceeds a threshold temperature which is predetermined to signal the onset of an overcharge phase. $T_O$ in a preferred example has been preselected to be 11 degrees C. When the query of step 67 is answered in the negative, the procedure cycles back as shown by the return branch 68 to the beginning of the wait period 63, after which another temperature reading is taken. Upon finding at step 67 that the difference temperature or "Delta" exceeds the preset threshold $T_O$, charging is terminated, as shown by the final step 69 ("ENDCHARGING"). The described overcharge phase determination will thus be used as an overriding charge termination to prevent damage to the battery pack 12. Simpler temperature determinations have been found to be sufficiently inaccurate to subject respective batteries to possible overcharging conditions.

As a modification of the described step of discontinuing the charging operation, it would be, of course, possible to extend the charging operation into the overcharge phase, using a carefully lowered charging current, with respect to the magnitude of the charging current during the normal charging phase, to control the temperature rise during the overcharge phase of the charging cycle of the battery pack 12 within acceptable limits.

Figure 5:
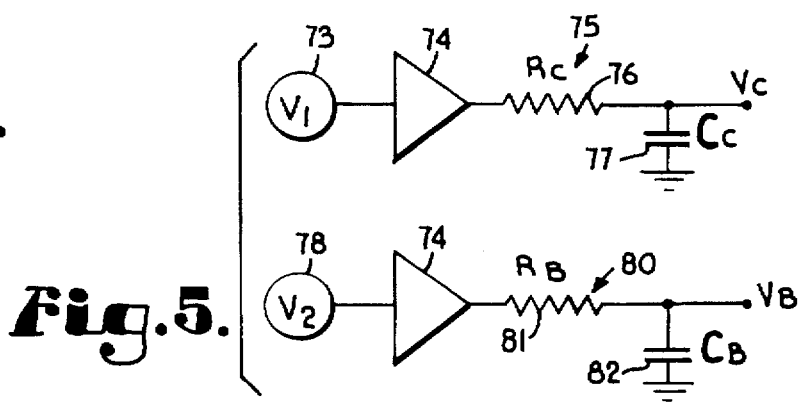
FIG. 5 is a schematic diagram showing as an electrical circuit, elements of which are considered electrical equivalents of thermal impedances and thermal mass which collectively delay responses to ambient temperature changes at a control temperature sensor and at a battery temperature sensor of a battery embedded in the apparatus of FIG. 1, for example.

FIG. 5 depicts a schematic diagram showing as an electrical circuit equivalent elements of the apparatus 10 as have been described above. In reference to FIGS. 1 and 5, the voltage signal at a source 73 ("V1") represents an ambient temperature which would be applied to the apparatus 10. A buffer amplifier 74 is shown to denote the direct influence of the temperature on the apparatus 10. The delay with which the applied temperature and particularly an applied change in temperature is actually read by the control sensor 28, as indicated by Vc of the subcircuit 75, depends on the magnitudes of an impedance 76 and a capacitance 77. In a lower branch, a temperature is represented by a voltage 78 ("V2") which is also shown as applied through a buffer 74 to a lower subcircuit 80. The subcircuit 80 includes a characteristic impedance 81 and a characteristic capacitance 82 which represent the characteristic thermal impedance and mass of the battery pack 12. What makes the actual determination of the lag of a temperature response measured as $V_B$ of the lower equivalent subcircuit 80 complex, is that the input voltage V2 to the lower branch differs from the ambient temperature V1. In fact, the voltage signal V2 as a variable temperature input is modified in part by the RC network elements of the subcircuit 75. The already modified signal V2 is then further modified by the RC circuit in subcircuit 80 which represents the thermal impedance and mass of the battery pack 12 itself. In determining delay factors for computing characteristic temperature delays for the portable apparatus 10, it may be possible to model the apparatus by analog equivalents, as suggested by the schematic of FIG. 5.

It is readily seen from the above, that various changes and modifications in the use and implementation of the described embodiments are possible, in addition to the changes and modifications already described, without departing from the spirit and scope of the invention as set forth in the claims.

What is claimed is:

1. A method of charging a battery, the method comprising the steps of:
   determining a temperature change characteristic at the battery in response to a temperature change of the environment of the battery;
   monitoring the temperature of the environment of the battery as the battery is being charged;
   determining an anticipated temperature change at the battery in response to the monitored temperature of the environment of the battery as the battery is being charged;
   measuring the actual temperature change at the battery as the battery is being charged;
   comparing the anticipated temperature change at the battery with the actual temperature change at the battery; and
   discontinuing charging of the battery as the actual temperature change at the battery exceeds the anticipated temperature change at the battery by a predetermined number of degrees.

2. The method according to claim 1, wherein the step of determining the temperature change characteristic at the battery includes applying a known temperature change to the environment of the battery and determining temperature changes at the battery responsive thereto.

3. The method according to claim 1, wherein the step of determining the temperature change characteristic includes applying a known temperature change to the environment of the battery and determining a characteristic delay in temperature change at the battery responsive thereto.

4. Apparatus for determining onset of an overcharge phase of a battery during a charging cycle thereof wherein the battery has a pre-charging time/temperature relationship between changes in the temperature of the battery in response to changes in the temperature of the environment of the battery, the apparatus comprising:
   a control temperature sensor;
   a battery temperature sensor; and
   a control arrangement, communicatively coupled to the environment and battery temperature sensors, configured to determine from the relationship an anticipated battery temperature responsive to a temperature change of the environment of the battery as measured by the control temperature sensor, to determine deviation from the anticipated battery temperature of the actual battery temperature as measured by the battery temperature sensor, and to determine onset of an overcharge phase of the battery as the actual battery temperature exceeds the anticipated battery temperature by a predetermined number of degrees.

5. The apparatus according to claim 4, wherein the control arrangement comprises a microprocessor device.

6. The apparatus according to claim 5, wherein the control and battery temperature sensors are communicatively coupled through respective first and second analog-to-digital signal converters to the microprocessor device.

7. The apparatus according to claim 4, wherein the control temperature sensor and the battery temperature sensor have matched thermal impedances.

8. The apparatus according to claim 7 including thermal insulation configured to operatively shield the control temperature sensor from temperature changes in the environment of the battery such that the control temperature sensor and the battery temperature sensor have approximately equal delayed responses to changes in temperature of the environment of the battery.

9. The apparatus according to claim 4 including thermal insulation configured to operatively insulate the control temperature sensor from temperature changes within the battery during the charging cycle.

10. The apparatus according to claim 4, including a resistor-capacitor circuit coupled to the control temperature sensor and configured to operatively approximate the thermal mass of the battery.

11. The apparatus according to claim 4, wherein the control temperature sensor includes a signal circuit configured to operatively provide an active signal as the difference between the battery and control temperature sensors exceeds a predetermined magnitude.

12. Apparatus comprising:
  (a) a portable device configured to be powerable by a battery and having a casing;
  (b) a control temperature sensor disposed adjacent to the casing and configured to operably measure the temperature of the casing;
  (c) a battery embedded within and configured to power the portable device, the battery having a pre-charging time/temperature characteristic relating changes in the temperature of the battery to changes in the temperature of the casing;
  (d) a battery temperature sensor configured to measure the temperature of the battery; and
  (e) a microprocessor circuit arrangement configured to charge the battery, to determine from the time/temperature characteristic an anticipated temperature change for the battery responsive to a change in the temperature of the casing, to compare the anticipated temperature of the battery with the actual temperature of the battery, and to discontinue charging of the battery as the anticipated temperature of the battery exceeds the actual temperature of the battery by a predetermined number of degrees.

13. The apparatus according to claim 12, wherein the battery temperature sensor is embedded with the battery.

14. The apparatus according to claim 7, wherein the battery temperature sensor is embedded between cells of the battery.

15. The apparatus according to claim 7, wherein the control temperature sensor is embedded within the casing.

16. The apparatus according to claim 7, wherein the control temperature sensor is embedded within an element of the portable device such that contact between the element and a user's hand carrying the portable device is minimized.

17. The apparatus according to claim 7, wherein the control temperature sensor is embedded within the portable device such that the control temperature sensor is unaffected by body heat of a user.

* * * * *